United States Patent Office 3,042,654
Patented July 3, 1962

3,042,654
POLYSTYRENE STABILIZED WITH METHYL METHACRYLATE
Henno Keskkula, Midland, and Arthur A. Pettis, Saginaw, Mich., assignors to The Dow Chemical Company, Midland, Mich., a corporation of Delaware
No Drawing. Filed Aug. 31, 1959, Ser. No. 836,950
1 Claim. (Cl. 260—45.85)

This invention relates to stabilized, polymerized monovinyl aromatic hydrocarbons, and is more particularly concerned with a composition of matter consisting essentially of polymerized monovinyl aromatic hydrocarbons and monomeric methyl methacrylate as a stabilizing agent and a process for stabilizing to inhibit effects of exposure to light, heat, or outdoor weathering.

Polystyrene and other vinyl aromatic polymers are known to undergo undesirable physical changes upon prolonged exposure to heat or light. The observable symptoms of such changes are discoloration or embrittlement, or often both, due in varying degree to the action of light or heat with resultant deterioration of the mechanical properties of the polymer. Since the vinyl aromatic polymers are commonly utilized to produce esthetic articles of manufacture, such discoloration and embrittlement is a factor limiting the adaptability of vinyl aromatic polymers to some uses. Particularly, the outdoor sign industry and building manufacturers are keenly aware of discoloration effects when vinyl aromatic polymers are subjected to the outdoor elements such as with sunlight and heat.

A principal object of this invention is to provide a composition of vinyl aromatic polymers that resists discoloration and embrittlement.

Another object of this invention is to provide a composition of vinyl aromatic polymers that resists discoloration and embrittlement when subject to outdoor elements such as sunlight and heat.

Another object of this invention is to provide a process for preparing a composition of vinyl aromatic polymers that resist discoloration and embrittlement when subject to outdor elements such as sunlight and heat.

Other objects of this invention will become apparent hereinafter.

The foregoing objects may be attained by mixing, preferably intimately incorporating, with the thermoplastic vinyl aromatic polymer from 0.1 to 5, preferably 2 to 4 percent by weight of methyl methacrylate. Articles produced from the resulting composition show a decided resistance to discoloration and embrittlement as compared to articles made from a vinyl aromatic polymer substance having no methyl methacrylate mixed therein with the further attribute of not being hazy, which could be expected if methyl methacrylate homopolymer is formed in the presence of a vinyl aromatic polymer such as polystyrene.

Methyl methacrylate may be incorporated with the normally solid thermoplastic polymers of any one or more monovinyl aromatic hydrocarbons of the benzene series and are effective stabilizers for inhibiting the embrittling or discoloring effects of exposure of the polymer to heat, light, or outdoor weathering. Examples of vinyl aromatic polymers are the homopolymers of styrene, vinyl toluene, vinylxylene, ethylvinyl benzene, isopropylstyrene, ethylvinyl toluene, tertiary butyl styrene, diethyl styrene or copolymers containing at least 50 percent of any one, two or more such monovinyl aromatic hydrocarbons.

The compositions may be prepared in any of several ways, e.g. by heat-plastifying the polymer on compounding rolls, a Banbury mixer or in a plastic extruder and intimately mixing methyl methacrylate therewith in the desired proportion.

In practice, the polymer, e.g. polystyrene, is heat-plastified and mechanically worked on compounding rolls, a Banbury mixer or in a plastics extruder, after which methyl methacrylate is intimately incorporated in the desired proportion to obtain a uniform composition. The composition is usually cooled and cut or ground to a granular form suitable for molding.

Small amounts of dyes, colors, pigments, plasticizers, etc., may also be incorporated with the composition, but such additives are not essential to acquiring stability. Such additives, when used, are usually employed in amounts of from 0.5 to 10 percent by weight of the polymer.

The following example is given to illustrate the invention but is not to be construed as limiting the invention thereto.

*Example 1*

In each of two experiments, a mixture of two percent and four percent of methyl methacrylate by weight of polystyrene was heat-plastified and milled on laboratory compounding rolls at temperatures between 250° F. to 350° F. for a period of about six minutes, removed, allowed to cool and crushed to a granular form. Portions of the composition were injection molded to form test plates having the dimensions 6½ x ½ inches by ⅛ inch thick. The test pieces were used to determine the effect of the added methyl methacrylate for inhibiting discoloration of the polystyrene upon exposure to outdoor weathering. The procedure for determining the stabilizing action of methyl methacrylate was to measure the percent of light of wave lengths between 420 and 620 millimicrons transmitted through a molded test piece as initially prepared. The difference between the amount of light transmitted at wave lengths of 420 and 620 millimicrons represents a measure of the composition color ($\Delta T$). The test pieces were then exposed to outdoor weathering in the State of Florida at about latitude 25° North on a rack facing south with the test pieces inclined at a 45 degree angle above horizontal for about three months. After the test pieces were exposed to the foregoing Florida weathering, they were removed and again tested for color as previously described. The difference between the color of the composition as originally prepared and the color of the composition after exposure represents a measure of the coloration or yellowing of the polymer due to weathering. The table hereinafter, displayed, identifies the composition by the percent of methyl methacrylate incorporated into the polystyrene. The table also gives the color of the composition as originally prepared, its color after subjection to the Florida weathering and the differences thereof. For comparison, test pieces of polystyrene without methyl methacrylate were prepared and tested under similar conditions. The results obtained were as follows:

| Agent Added | Percent | Initial $\Delta T$ | Final $\Delta T$ | Change in $\Delta T$ |
|---|---|---|---|---|
| None | 0.0 | 3.3 | 26.7 | 23.4 |
| Methyl Methacrylate | 2.0 | 3.1 | 20.5 | 17.4 |
| Do | 4.0 | 3.1 | 17.8 | 14.7 |

Various modifications may be made in the present invention without departing from the spirit or scope thereof,

We claim:

A composition of matter consisting essentially of polystyrene and, as a stabilizing agent therefor, from 2 to 4 percent, based on the weight of the polystyrene, of monomeric methyl methacrylate.

References Cited in the file of this patent

UNITED STATES PATENTS

| | | |
|---|---|---|
| 2,784,172 | Slocombe et al. | Mar. 5, 1957 |
| 2,837,496 | Vandenberg | June 3, 1958 |

FOREIGN PATENTS

| | | |
|---|---|---|
| 612,070 | Great Britain | Nov. 8, 1948 |